(12) United States Patent
Konakalla et al.

(10) Patent No.: US 10,990,072 B2
(45) Date of Patent: Apr. 27, 2021

(54) MAINTAINING POWER GRID STABILITY USING PREDICTED DATA

(71) Applicant: PXiSE Energy Solutions, LLC, San Diego, CA (US)

(72) Inventors: Sai Akhil Reddy Konakalla, La Jolla, CA (US); Raymond A. de Callafon, San Diego, CA (US)

(73) Assignee: PXiSE Energy Solutions, LLC, San Diego, CA (US)

( * ) Notice: Subject to any disclaimer, the term of this patent is extended or adjusted under 35 U.S.C. 154(b) by 520 days.

(21) Appl. No.: 15/824,392

(22) Filed: Nov. 28, 2017

(65) Prior Publication Data

US 2019/0166026 A1   May 30, 2019

(51) Int. Cl.
*G05B 19/048*   (2006.01)

(52) U.S. Cl.
CPC .... *G05B 19/048* (2013.01); *G05B 2219/2639* (2013.01); *H02J 2203/20* (2020.01)

(58) Field of Classification Search
CPC . H04L 43/0829; H04L 41/147; H04L 43/028; H04L 41/145; H04L 67/42; H02J 3/381; H02J 2203/20; H02J 2300/10; H02J 3/1821; H02J 13/0082; G05B 19/048; G05B 2219/2639
See application file for complete search history.

(56) References Cited

U.S. PATENT DOCUMENTS

| | | | |
|---|---|---|---|
| 6,819,087 B2 | 11/2004 | Delmerico et al. | |
| 6,985,800 B2 | 1/2006 | Rehtanz et al. | |
| 7,096,175 B2 | 8/2006 | Rehtanz et al. | |
| 7,274,975 B2 | 9/2007 | Miller | |
| 7,490,013 B2 | 2/2009 | Wells | |
| 7,498,821 B2 | 3/2009 | Wells | |
| 7,710,729 B2 | 5/2010 | Li et al. | |
| 7,755,371 B2 | 7/2010 | Wells | |
| 7,961,112 B2 | 6/2011 | Wells | |
| 7,987,059 B2 | 7/2011 | Gong et al. | |

(Continued)

FOREIGN PATENT DOCUMENTS

| | | |
|---|---|---|
| CN | 102185326 A | 9/2011 |
| CN | 102707628 A | 10/2012 |

(Continued)

OTHER PUBLICATIONS

Patent Cooperation Treaty, International Search Report for PCT/US2017/034765, dated Oct. 9, 2017.

(Continued)

*Primary Examiner* — Christopher E. Everett
(74) *Attorney, Agent, or Firm* — Jones Day

(57) ABSTRACT

Systems and methods are described herein for maintaining stability of a power grid by providing a continuous power system data stream. Power system data including one or more data packets is monitored to identify reliability of data transmission. A predicted data packet is continually generated, characterizing predicted power system data of the power grid based on filtering of the one or more past and most recent non-missing and reliable data packets. A substitution factor of the one or more data packets is determined. The predicted data packet is selectively substituted in place of the one or more data packets based on the substitution factor.

21 Claims, 6 Drawing Sheets

(56) References Cited

U.S. PATENT DOCUMENTS

| | | |
|---|---|---|
| 8,022,575 B2 | 9/2011 | Korba et al. |
| 8,457,912 B1 | 6/2013 | Wells |
| 8,498,752 B2 | 7/2013 | Wells |
| 8,532,230 B2 | 9/2013 | Taft |
| 8,659,186 B2 | 2/2014 | Teichmann et al. |
| 8,738,191 B2 | 5/2014 | Aivaliotis et al. |
| 8,892,375 B2 | 11/2014 | Taft |
| 8,907,615 B2 | 12/2014 | Mills-Price et al. |
| 8,942,856 B2 | 1/2015 | Ren et al. |
| 9,037,425 B2 | 5/2015 | Yang et al. |
| 9,043,037 B2 | 5/2015 | Bhageria et al. |
| 9,166,500 B2 | 10/2015 | Wu et al. |
| 9,230,429 B2 | 1/2016 | McKinley et al. |
| 9,411,389 B2 | 8/2016 | Shi et al. |
| 9,444,257 B2 | 9/2016 | Wells |
| 9,496,715 B2 | 11/2016 | Wilson |
| 9,507,367 B2 | 11/2016 | Venayagamoorthy et al. |
| 9,588,156 B2 | 3/2017 | Glavic et al. |
| 9,634,850 B2 | 4/2017 | Taft et al. |
| 2005/0160128 A1* | 7/2005 | Fardanesh ............ G06F 30/3323 708/446 |
| 2008/0071482 A1 | 3/2008 | Zweigle et al. |
| 2009/0216469 A1* | 8/2009 | Marik ................... G05B 15/02 702/61 |
| 2009/0319090 A1 | 12/2009 | Dillon et al. |
| 2011/0276194 A1 | 11/2011 | Emalfarb et al. |
| 2013/0043690 A1 | 2/2013 | Wilson et al. |
| 2013/0073108 A1 | 3/2013 | Kolwalkar |
| 2013/0073109 A1 | 3/2013 | Cheng et al. |
| 2013/0085616 A1* | 4/2013 | Wenzel ............... G05D 23/1917 700/278 |
| 2013/0218494 A1 | 8/2013 | Chiang et al. |
| 2013/0245949 A1* | 9/2013 | Abitrabi ................. G01V 13/00 702/6 |
| 2013/0262012 A1 | 10/2013 | O'Sullivan et al. |
| 2014/0070617 A1 | 3/2014 | Detmers et al. |
| 2014/0074306 A1 | 3/2014 | Lu et al. |
| 2014/0074311 A1 | 3/2014 | Kearns et al. |
| 2014/0159658 A1 | 6/2014 | Kiceniuk et al. |
| 2014/0244065 A1 | 8/2014 | Biswas et al. |
| 2014/0277599 A1 | 9/2014 | Pande et al. |
| 2014/0306534 A1 | 10/2014 | Shi et al. |
| 2015/0005967 A1 | 1/2015 | Jóhannsson et al. |
| 2015/0006141 A1 | 1/2015 | Enenkel et al. |
| 2015/0051852 A1 | 2/2015 | Pan et al. |
| 2015/0051856 A1 | 2/2015 | Chu et al. |
| 2015/0073735 A1 | 3/2015 | Abido et al. |
| 2015/0100282 A1 | 4/2015 | Shokooh et al. |
| 2015/0121160 A1* | 4/2015 | Baone ................ G06F 11/1415 714/746 |
| 2015/0326160 A1 | 11/2015 | Diez-Maroto et al. |
| 2015/0371151 A1* | 12/2015 | Georgescu ............ G06N 20/00 706/12 |
| 2016/0003879 A1 | 1/2016 | Wilson et al. |
| 2016/0091537 A1 | 3/2016 | Gaarder et al. |
| 2016/0118878 A1 | 4/2016 | Alteneiji |
| 2016/0179120 A1 | 6/2016 | Boardman et al. |
| 2016/0198245 A1 | 7/2016 | Rhoads et al. |
| 2016/0241035 A1 | 8/2016 | Shi et al. |
| 2016/0266559 A1 | 9/2016 | Shi et al. |
| 2016/0299187 A1 | 10/2016 | Liang et al. |
| 2016/0306373 A1* | 10/2016 | Mashima ............... G06Q 50/06 |
| 2016/0313197 A1 | 10/2016 | Acharya et al. |
| 2016/0320435 A1 | 11/2016 | Budhraja et al. |
| 2016/0329700 A1 | 11/2016 | O'Brien et al. |
| 2016/0329709 A1 | 11/2016 | Park et al. |
| 2016/0334447 A1 | 11/2016 | Parashar et al. |
| 2017/0012468 A1 | 1/2017 | Park |
| 2017/0017298 A1 | 1/2017 | Biswas et al. |
| 2017/0104366 A1 | 4/2017 | Münz |
| 2017/0109524 A1 | 4/2017 | Kolacinski et al. |
| 2017/0346286 A1 | 11/2017 | Wells et al. |
| 2017/0346291 A1 | 11/2017 | Wells et al. |
| 2018/0123388 A1* | 5/2018 | Itaya ................. H02J 13/00002 |

FOREIGN PATENT DOCUMENTS

| | | |
|---|---|---|
| CN | 203166515 U | 8/2013 |
| CN | 103414245 A | 11/2013 |
| CN | 103474992 A | 12/2013 |
| CN | 103632313 A | 3/2014 |
| CN | 104242462 A | 12/2014 |
| CN | 104297632 A | 1/2015 |
| CN | 104865474 A | 8/2015 |
| CN | 105224811 A | 1/2016 |
| CN | 105375484 A | 3/2016 |
| CN | 105529704 A | 4/2016 |
| CN | 106383287 A | 2/2017 |
| CN | 106443246 A | 2/2017 |
| EP | 1 830 447 A1 | 9/2007 |
| EP | 1 919 076 A2 | 5/2008 |
| EP | 2 182 207 A2 | 5/2010 |
| KR | 20160038927 A | 4/2016 |
| WO | 2011150247 A1 | 12/2011 |
| WO | 2014061889 A1 | 4/2014 |
| WO | WO-2014138896 A1 * | 9/2014 ............... H02J 3/00 |
| WO | 2017/210124 A1 | 12/2017 |

OTHER PUBLICATIONS

Patent Cooperation Treaty, Written Opinion of the International Searching Authority for PCT/US2017/034765, dated Oct. 9, 2017.

* cited by examiner

MAINTAINING POWER GRID STABILITY USING PREDICTED DATA

TECHNICAL FIELD

The subject matter described herein relates to maintaining stability of a power grid to avoid unexpected interruptions and to minimize unexpected variability.

BACKGROUND

Power systems can generate and distribute electricity to a number of energy consumers or loads. Power generation can result from the conversion of non-renewable and/or renewable resources into electrical energy. Power from such resources can be monitored by one or more controllers through various data streams. Data packets within the data streams can be unreliable at times due to intermittent data transmission and/or invalid data. Such unreliability can lead to instability of the power grid, and in extreme cases, cause power outages.

SUMMARY

In one aspect, stability of a power grid is maintained by providing a continuous power system data stream. Power system data including one or more data packets is monitored to identify reliability of data transmission. The power system data can include at least one of active power data, reactive power data, frequency data, voltage phasor data, or current phasor data. The power system data can be provided by at least one of a phasor measurement unit (PMU), a photovoltaic cell, a battery, a fuel cell, a wind turbine, a combined cycle gas turbine, a sterling engine, an energy storage system, or a generator.

A predicted data packet is continually generated characterizing predicted power system data of the power grid based on filtering of the one or more data packets. A substitution factor of the one or more data packets is determined. In some variations, the substitution factor is based on packet loss of the one or more data packets. In other variations, the substitution factor is based on an invalidity flag associated with the one or more data packets. The predicted data packet is selectively substituted in place of the one or more data packets based on the substitution factor of the one or more data packet to facilitate a continuous, reliable power system data stream within the power grid.

In some variations, the predicted data packet is continually generated by determining a first filter based a predetermined number of samples of the one or more past and most recent non-missing and reliable data packets over a predetermined time duration. In some variations, the first filter is based on a down-sampling of the past and most recent non-missing and reliable predetermined number of samples. A second filter can be determined based on the one or more data packets and the predicted data packet. In some variations, the second filter comprises a recovery filter or a smoothing filter. The first filter or the second filter can be determined using at least one of an auto-regressive estimation or an auto-regressive moving average estimation. The error within the filtered data packet can be minimized using at least one of a linear predictor model or a non-linear predictor model.

Systems are also described that include one or more data processors and memory storing instructions which when executed by one or more data processors perform operations described herein. Non-transitory computer program products (i.e., physically embodied computer program products) are also described that store instructions, which when executed by one or more data processors of one or more computing systems, cause at least one data processor to perform operations described herein. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for automatically selecting and substituting predicted power system data in place of missing or unreliable data packets of the power system. The automatic selection and replacement of power system data provides the concept of power system data ride-through. Use of the subject matter as described herein assists with providing a continuous, reliable power system data stream to maintain stability of the power system by ensuring that missing or unreliable data is substituted with predicted data that is based on past and most recent non-missing and reliable observations of power system data obtained from the power system. Additionally, the subject matter herein provides for the substitution of missing or unreliable power system data of either a power consumer of the power grid or a power supplier to the power grid.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

An electric power system (EPS) can be made up of, for example, one or more distributed energy resources (DERs)

which include renewable and/or non-renewable energy resources. Example non-renewable DERs can include combined cycle gas turbines, sterling engines, diesel motors or thermal energy sources that can generate power using, for example, gasoline, oil or natural gas and other combustible material (e.g., garbage, bagasse or other organic material). Examples of renewable energy resources can include photovoltaic cells, fuel cells, wind turbines or hydroelectric dams. In addition, DERs can also be batteries or other energy storage systems such as electric vehicle charging systems that have the ability to store or produce electric energy.

Power system data provided by one or more DERs can be represented by digital power system data having one or more data packets. Power system data can include, for example any data related to the power system such as active (real) power, reactive power, frequency, voltage phasor, current phasor, etc. The power system data can be either measured directly from the power system and/or derived based on measurements of the power system by at least one of a phasor measurement unit (PMU). Data transmission of the power system data can, at times, be unreliable due to data loss and/or validity issues. Such unreliability can cause the power system to be unstable, and in extreme cases cause temporary and/or permanent power loss. In order to address such instability, the power system data can be monitored and substituted, when necessary, with predicted data. The predicted data can replace the missing or unreliable power system data. Such replacement can be made transparent to the power providers and/or consumers of the power system.

Figure 1:
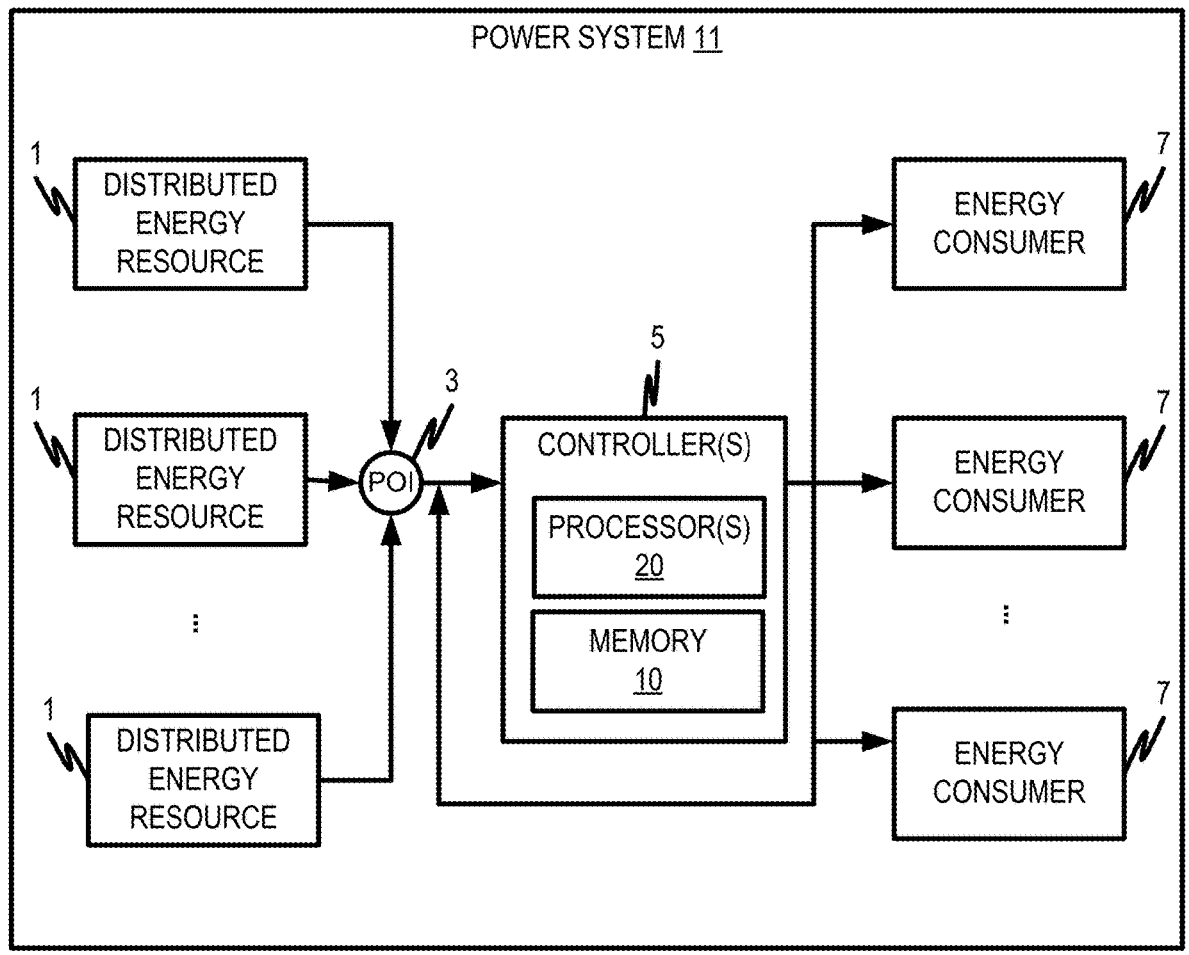
FIG. 1 is a system block diagram illustrating an example power system architecture.

FIG. 1 is a system block diagram illustrating an example power system 11 having one or more distributed energy resources 1 monitored and/or controlled by one or more controllers 5. For example, one or more DERs 1 can include one or more of: a photovoltaic cell, a battery, a fuel cell, a wind turbine, a combined cycle gas turbine, a sterling engine, an energy storage system, or a generator. One or more DERs 1 can have individual power system data streams that collectively come together at a Point of Interconnection (POI) 3. Although not illustrated in FIG. 1, it is recognized that power system 11 can also have more than one POI 3 and by at least one of a phasor measurement unit (PMU) to measure power system data. A combined power system data stream can continuously flow to and be monitored by one or more controllers 5. One or more controllers 5 can perform various operations as described herein to generate a power system data stream for one DER or a combined control data stream from multiple DERs to one or more energy consumers 7. The control data stream output by the one or more controllers 5 can also be fed back as a feedback data stream. Controller 5 can include memory 10 for storing instructions for execution by one or more processor/processor cores 20. Memory 10 can also be capable of storing data such as historical power system data provided by one or more DERs 1.

Figure 2:
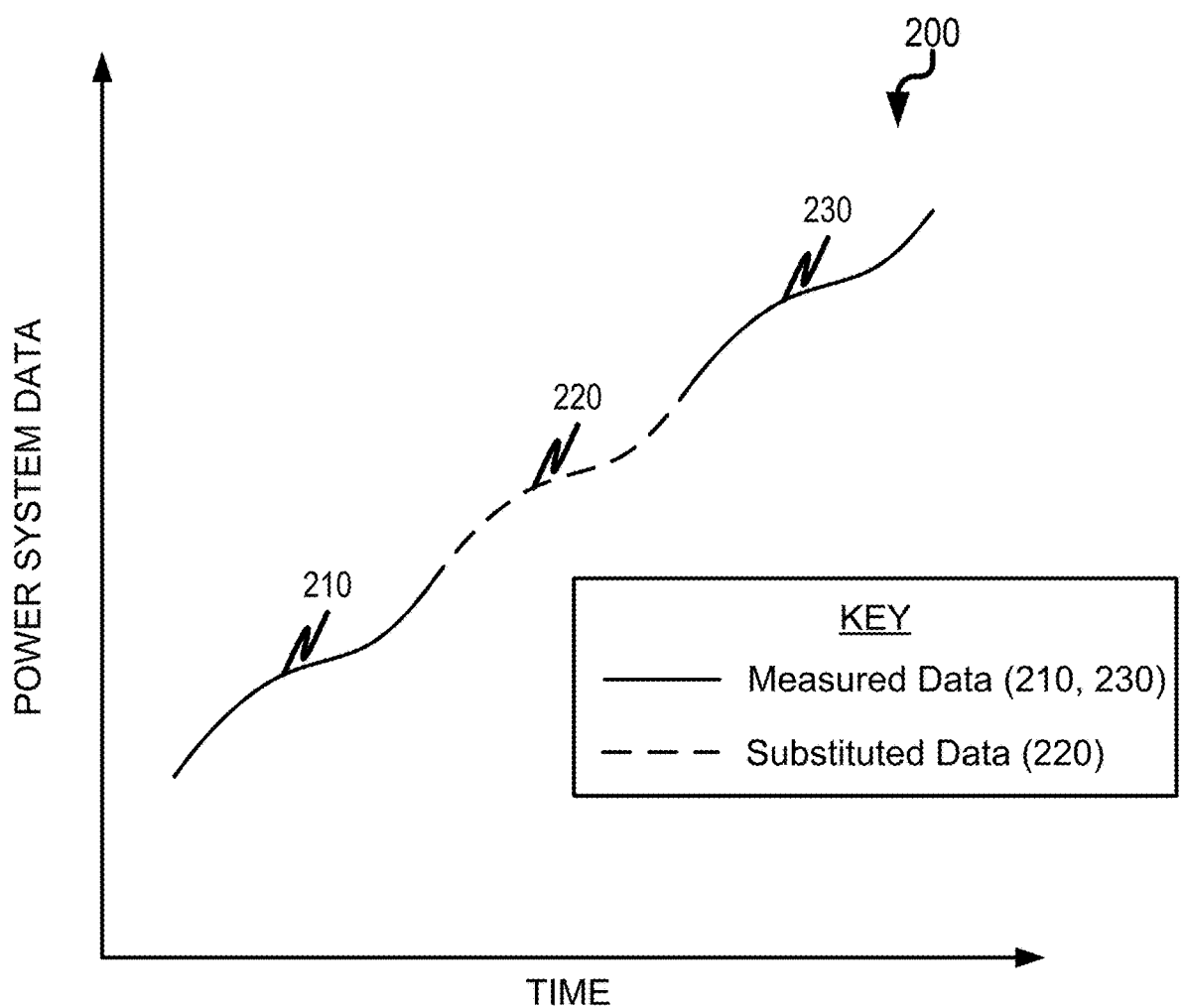
FIG. 2 is a plot illustrating an example power system data curve of a power system having both measured and a missed data stream replaced by a substituted data streams.

FIG. 2 is a plot 200 illustrating an example power system data curve of a power system 11. Controller 5, for example, can monitor the data from POI 3 to identify reliability of the data transmission. The data can include real and/or complex representations of current and/or voltage provide by the one or more DERs 1. The power system data can include one or more digital data packets which characterize power of the power system 11, such as active (real) power, reactive power, frequency, voltage phasor, current phasor, etc. A theoretical illustration of power system data at POI 3 represented by the one or more data packets over time is illustrated on plot 200 by the measured data plot lines 210, 230. There are, however, instances when the measured power system data is missing or unreliable. For example, data can be missing due to a lapse in data transmission (e.g., packet loss) to controller 5. The measured data can also be unreliable or of poor quality because it is flagged to be invalid as provided by the source. For example, one or more DERs or PMUs can output an invalidity flag (e.g., within the metadata) for a particular data packet to indicate that, for a reason determined by the DER (e.g., pre-programmed specification of power output tolerances, failure to meet output tolerance levels), the measured data is unreliable calculation purposes. When the power system data stream is identified as being missing or unreliable generated by the sensor, predicted data packets can be substituted in place of the unreliable or missing data. The predicted data packets can be continually generated by controller 5. These predicted packets can then be substituted in place of the unreliable measured power system data or missing power system data as illustrated by substituted data plot line 220. Substituted data plot line 220 can be selectively substituted over a time interval having either missing or unreliable data. Selectively substituting predicted data packets can help maintain stability of the power system 11 by providing data packets that would otherwise be absent from the power system data stream through either packet loss or unusable due to being invalid.

Based on historical power system data, one or more data processors 10 can continually generate the predicted data packets which characterizes predicted power measurement data of power system 11. The predicted data packet can be generated by applying a predictor factor to historical power system data that has been filtered using a prediction filter. The prediction filter can be a one-time type calculated filter that is stored within memory 20. Alternatively, the prediction filter can be dynamically generated and applied in real-time.

In one variation, a prediction filter can be determined based on a number of samples over a time duration defined by an endpoint, $t_n$. An endpoint, $t_n$, can be statically or dynamically defined. The endpoint, $t_n$, should be greater than the multiplicative combination of the number of historical data samples, r, and number of steps, k, ahead of an initial time, to, being predicted (e.g., n>r*k). Using the number of historical data samples, r, across a time window spanning between a start time, $t_{n-r}$, and an endpoint, to, a prediction filter, $F_1(q)$, can calculated so as to minimize the least squares of the fit using a maximum likelihood estimation method (e.g., auto-regressive (AR) method, auto-regressive moving average (ARMA) method, or other non-linear models such as non-linear least squares using singular value decomposition, gradient and search methods.). In another variation, the predication filter, $F_2(q)$, can be generated using similar methods as described with respect to prediction filter, $F_1(q)$. However, the historical data used for predication filter, $F_2(q)$, can be a down-sampled version of historical data spanning a time duration from a start point, $t_{n-dr}$, to an endpoint, to, where "d" represents the down-sampling number. For example, a down-sampling of "2" would have a time duration spanning from $t_{n-2r}$ to a time endpoint, $t_n$. In yet another variation, a prediction filter can be computed by down-sampling the power system data such that the frequencies of the time-series data can be captured over most spectrally dense regions. The prediction filter can be computed as a result of any optimization where the objective function is to optimize over the band of frequencies to capture the most important spectral features of the time series signal. For example, the prediction filter can be characterized on a logarithmic scale or be a function of frequency (linear, non-linear, Bayesian) in order to capture time-series model dynamics.

Using the number of historical data samples, r, "k" number of prediction filters can be computed. With the prediction filter (e.g., $F_1(q)$, $F_2(q)$), a one-step ahead predictor, p(i), can be determined for each filter using methods that minimize the prediction error using least squares methods, non-linear optimization methods, stochastic optimization methods or genetic algorithm for optimization.

Once the power system data is found to be reliable again based on being either valid or is no longer missing (e.g., present within the power system data stream), the predicted power system data is no longer substituted and the measured power system data is restored, as illustrated by plot line 230. In order to allow for a smooth, controlled transition between the substituted data and the measured data, a recovery or smoothing filter can be utilized. The recovery or smoothing filter can be linear, exponential, or of other non-linear forms, such as:

$$Y(t)=m*F(t)+(1-m)*M(t) \quad (1)$$

where Y(t) is the filtered output of the data at a sample, t, F(t) is the predicted value of the data at a sample, t, M(t) is the measurement at a sample, t, and m is a real number between 0 and 1.

Figure 3A:
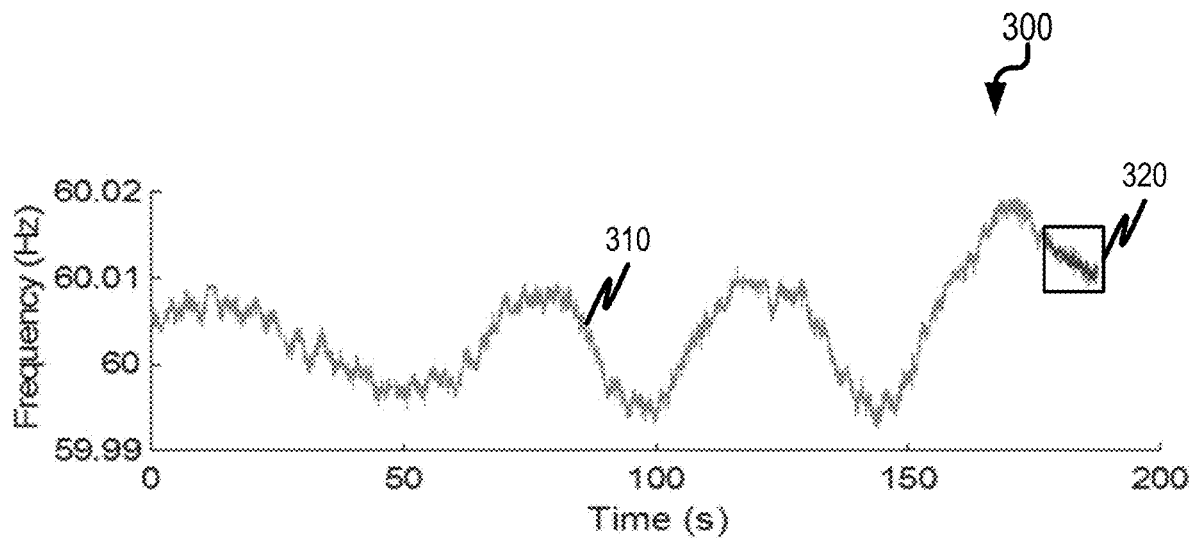
FIG. 3A is a frequency plot illustrating example power system data having both measured and substituted predicted data streams.
Figure 3B:
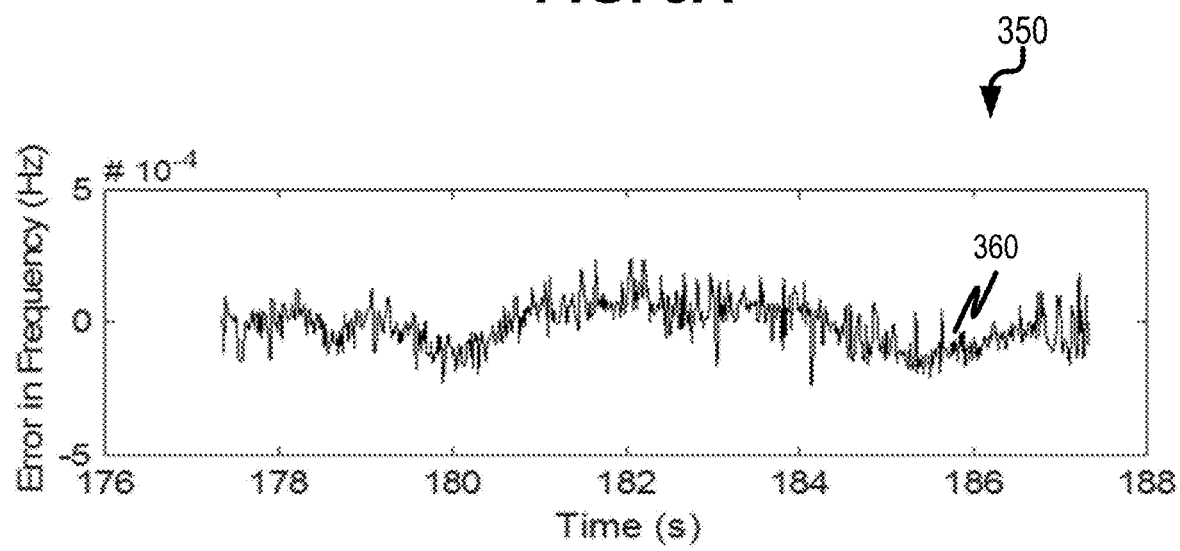
FIG. 3B is a frequency plot illustrating the minimized error between the substituted predicted data and the measured data.

FIG. 3A is a frequency plot 300, illustrating example power system data having both measured and predicted data. In this example, frequency of the power system data from a phasor measurement unit (PMU) (e.g., DER 1) is illustrated by plot line 310. Referring to the data illustrated in FIG. 3A, the number of data samples, r, is about 608,000 samples (e.g., characterizing approximately 3 hours) of frequency data that is transmitted of a rate of approximately 60 samples per second. From this, approximately 600 prediction filters, k, can be calculated. The frequency data is continually monitored, in real-time, by controller 5. In this example, the historical data spans from a start time, t=0, to an endpoint, t=608000. Of the data along plot line 310, the predetermined number of historical data samples, r, of 1000 within box 320 are evaluated. A prediction filter, $F_1(q)$, is computed to minimize the least squares using a maximum likelihood estimation method using historical data samples spanning from a start point, t=607000, to an endpoint, t=608000. Another prediction filter, $F_2(q)$, is computed using a similar method as the prediction filter, $F_1(q)$, but using downsampled data spanning from a start point, t=606000, to an endpoint, t=608000. In general, a prediction filter, $F_i(q)$, where i spans from 1 to 600, can have a start point of:

$$t=608000-i*1000 \quad (2)$$

and an endpoint of t=608000. Computing a one-step ahead predictor for prediction filter, $F_i(q)$, the data within box 320 is selectively substituted temporally in place of the frequency plot line 310. FIG. 3B is a frequency plot 350 illustrating the minimized error, represented by plot line 350, between the predicted data substituted within box 320 and the measured data it replaces. As illustrated in frequency plot 350, the error between the predicted data and the measured data is substantially zero (e.g., on the order of approximately $10^{-4}$).

Figure 4:
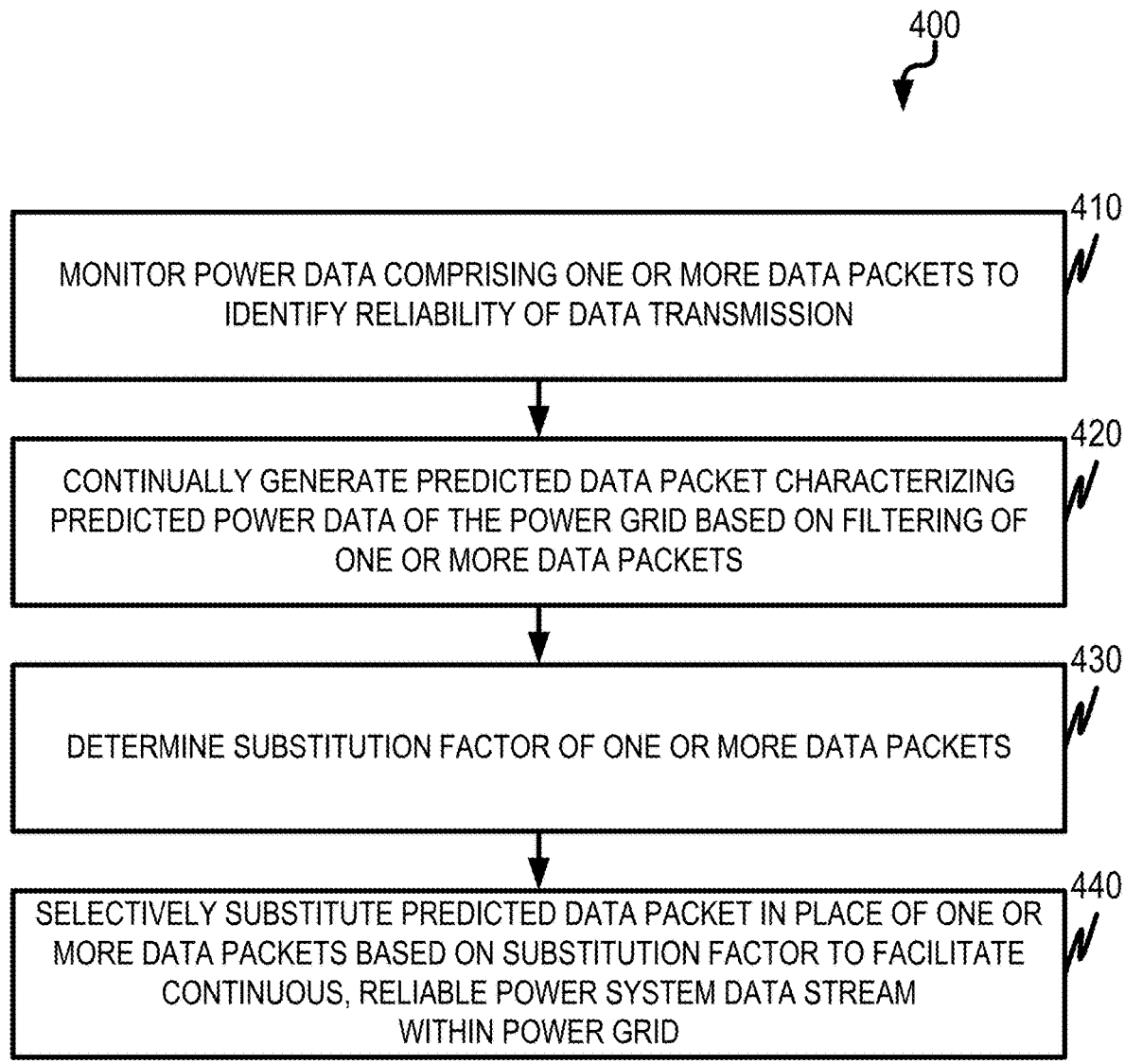
FIG. 4 is a process flow diagram 400 illustrating a method of providing a continuous power system data stream to maintain stability of a power system.

FIG. 4 is a process flow diagram 400 illustrating a method of providing a continuous power system data stream to maintain stability of a power system. Power system data having one or more data packets is monitored, at 410, by at least one data processor to identify reliability of the data transmission. A predicted data packet that characterizes predicted power system data of the power grid is continually generated, at 420, based on filtering of the one or more data packets using various methods as described herein. A substitution factor is determined of the one or more data packets, at 430. In some variations, reliability can be based on a substitution factor which indicates packet loss of the one or more data packets during data transmission (e.g., a large temporal gap between a data packet and a subsequent data packet). The substitution factor can also be based on an invalidity flag (e.g., within metadata of a data packet) that indicates the data provided within the packet is not valid. Invalidity flags can be assigned by the DER 1 providing the data packet. The predicted data packet can be selectively substituted, at 440, temporally in place of the one or more data packets based on the substitution factor to facilitate a continuous, reliable power system data stream within the power grid. For example, the predicted data packet can be substituted based on data packet being absent from the power system data stream due to packet loss or based on unreliability of the one or more data packets, such as a data packet being flagged invalid.

Figure 5:
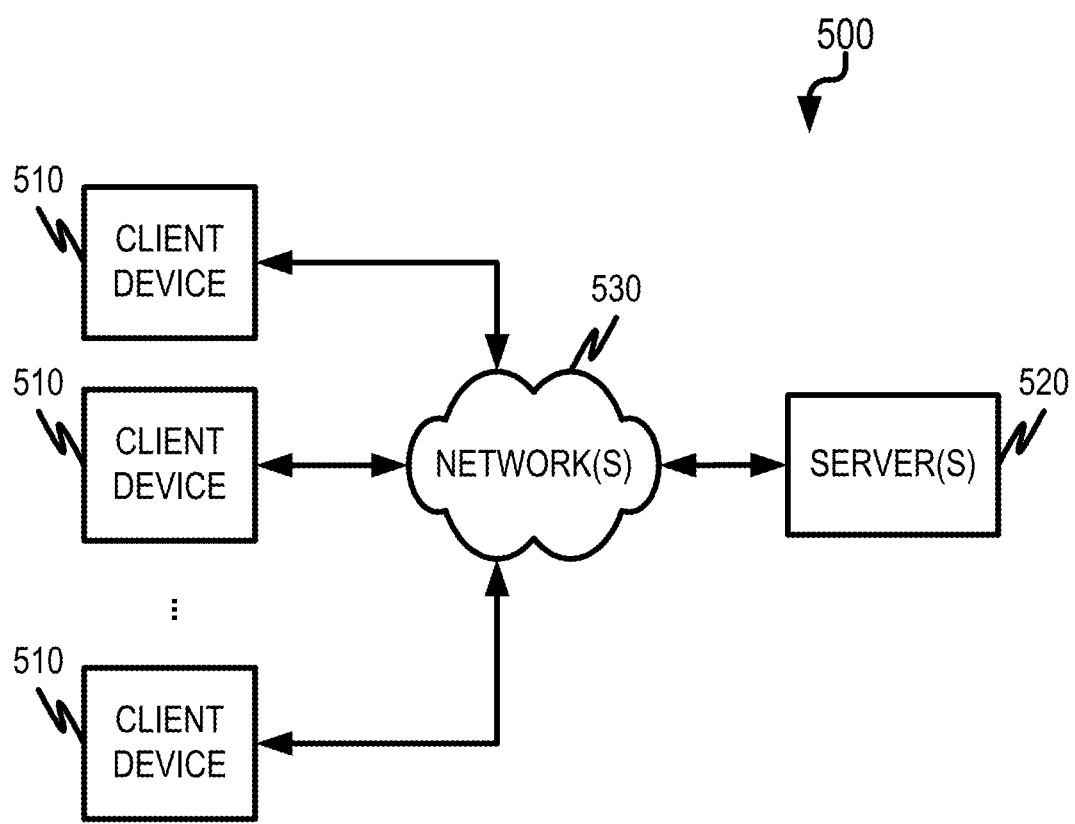
FIG. 5 is a system block diagram illustrating an architecture for use in connection with the current subject matter.

FIG. 5 is a system block diagram illustrating an architecture 500 for use in connection with the current subject matter. The current subject matter is described in connection with an arrangement involving one or more client devices 510 and one or more servers 520 which can communicate over one or more networks 530. Each of the one or more client devices 510 and the one or more servers 520 comprise one or more programmable data processors and memory for storing instructions for executed by such data processor(s). Furthermore, it will be appreciated that each of the client devices 510 or servers 520 can comprise more than one computing device depending on the desired configuration and that the illustrations in FIG. 5 is simplified to aid in the understanding of the current subject matter.

The functional blocks described herein can be implemented in commercial computing platforms such as advanced Programmable Logic Controllers (PLCs) or in industrial grade PCs such as the Schweitzer Engineering Laboratories (SEL) 3355 Industrial Personal Computer (PC) that runs multiple tasks, one of which is the controller. The controller processing functionality can be written in any computer language, but one implementation is using C++ running on Windows or Linux operating systems. The output commands from then controller may use standard control protocols such as IEC 61850 Goose or Modbus over Ethernet. In order to maintain high security, fiber optic connections can be used between the controller platform and the providers and/or consumers of the power grid.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 6:
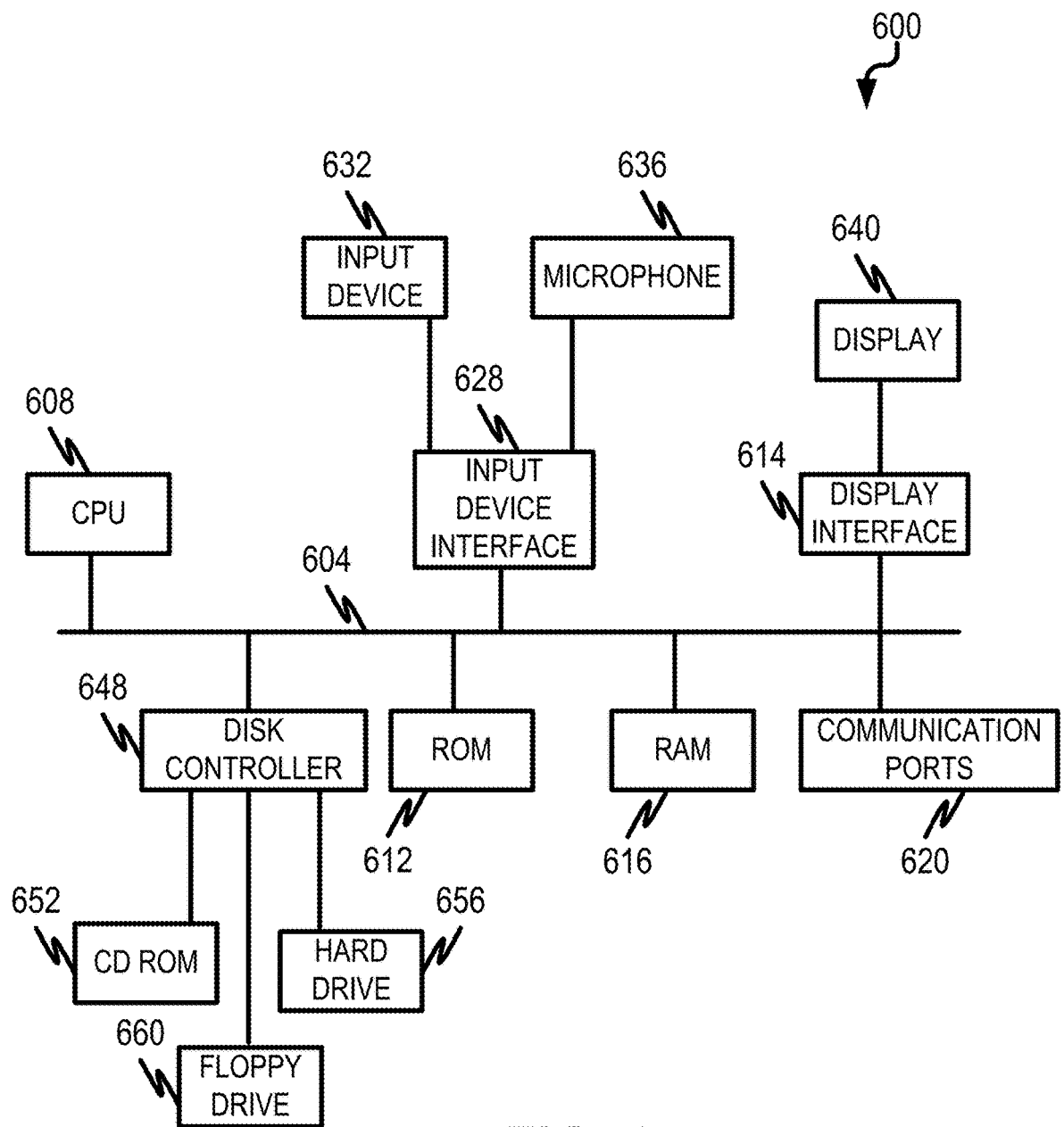
FIG. 6 is a diagram illustrating a sample computing device architecture for implementing various aspects described herein.

FIG. 6 is a diagram illustrating a sample computing device architecture 600 for implementing various aspects described herein. A system bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display 640 (e.g., a CRT (cathode ray tube) or LCD (liquid crystal display) monitor) for displaying information obtained from the system bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. In the input device 632 and the microphone 636 can be coupled to and convey information via the system bus 604 by way of an input device interface 628. Other computing devices, such as dedicated servers, can omit one or more of the display 640 and display interface 614, the input device 632, the microphone 636, and input device interface 628.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an un-recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of maintaining stability of a power grid implemented by one or more data processors forming one or more computing devices, the method comprising:

monitoring, by at least one data processor of a computing device, power system data comprising one or more data packets to identify data transmission reliability;

continually generating, by at least one data processor, a predicted data packet characterizing predicted power system data of the power grid based on filtering of the one or more data packets using at least two filters, wherein one of the at least two filters down-sample the power system data comprising at least one of active power data, reactive power data, frequency data, voltage phasor data, or current phasor data;

determining, by at least one data processor, a substitution factor of the one or more data packets; and dynamically and selectively substituting, by at least one data processor, the predicted data packet in place of the one or more data packets of the power system data in real time based on the substitution factor to facilitate a continuous, reliable power system data stream within the power grid, wherein the continuous, reliable power system data stream having the predicted data packet is provided to at least one distributed energy resource.

2. The method of claim 1, wherein the substitution factor is based on packet loss of the one or more data packets.

3. The method of claim 1, wherein the substitution factor is based on an invalidity flag associated with the one or more data packets.

4. The method of claim 1, wherein the power system data is provided by at least one of a phasor measurement unit (PMU), a photovoltaic cell, a battery, a fuel cell, a wind turbine, a combined cycle gas turbine, a sterling engine, an energy storage system, or a generator.

5. The method of claim 1, wherein continually generating comprises:
determining, by at least one data processor, a first filter based a predetermined number of samples of the one or more data packets over a predetermined time duration;
determining, by at least one data processor, a second filter based on the one or more data packets and the predicted data packet; and
generating, by at least one data processor, the predicted data packet by minimizing a prediction error of the first filter,
wherein the at least two filters comprise the first filter and the second filter.

6. The method of claim 5, wherein the first filter is based on a down-sampling of the predetermined number of samples of the one or more data packets over the predetermined time duration.

7. The method of claim 5, wherein the first filter is determined using at least one of an auto-regressive estimation or an auto-regressive moving average estimation.

8. The method of claim 5, wherein the error within the filtered data packet is minimized using at least one of a linear predictor model or a non-linear predictor model.

9. The method of claim 5, wherein the second filter comprises a recovery filter or a smoothing filter.

10. The method of claim 5, wherein the first filter is determined based a number of samples over a dynamically defined time window spanning a time duration from an initial time point to an endpoint, the endpoint being greater than a multiplicative combination of a number of historical data samples and a number of steps ahead of the initial time point.

11. The method of claim 1, further comprising gradually and smoothly restoring, by at least one data processor, the power system data based on the substitution factor.

12. A system for maintaining stability of a power grid, the system comprising:
at least one data processor;
memory storing instructions which by executed by at least one data processor result in operations comprising:
monitoring power system data comprising one or more data packets to identify data transmission reliability;
continually generating a predicted data packet characterizing predicted power system data of the power grid based on filtering of the one or more data packets using at least two filters, wherein one of the at least two filters down-sample the power system data comprising at least one of active power data, reactive power data, frequency data, voltage phasor data, or current phasor data;
determining a substitution factor of the one or more data packets; and
dynamically and selectively substituting the predicted data packet in place of the one or more data packets of the power system data in real time based on the substitution factor to facilitate a continuous, reliable power system data stream within the power grid,
wherein the continuous, reliable power system data stream having the predicted data packet is provided to at least one distributed energy resource.

13. The system of claim 12, wherein the substitution factor is based on packet loss of the one or more data packets.

14. The system of claim 12, wherein the substitution factor is based on an invalidity flag associated with the one or more data packets.

15. The system of claim 12, wherein the power system data is provided by at least one of a phasor measurement unit (PMU), a photovoltaic cell, a battery, a fuel cell, a wind turbine, a combined cycle gas turbine, a sterling engine, an energy storage system, or a generator.

16. The system of claim 12, wherein continually generating comprises:
determining, by at least one data processor, a first filter based a predetermined number of samples of the one or more data packets over a predetermined time duration;
determining, by at least one data processor, a second filter based on the one or more data packets and the predicted data packet; and
generating, by at least one data processor, the predicted data packet by minimizing a prediction error of the first filter,
wherein the at least two filters comprise the first filter and the second filter.

17. The system of claim 16, wherein the first filter is based on a down-sampling of the predetermined number of samples of the one or more data packets over the predetermined time duration.

18. The system of claim 16, wherein the first filter is determined using at least one of an auto-regressive estimation or an auto-regressive moving average estimation.

19. The system of claim 16, wherein the error within the filtered data packet is minimized using at least one of a linear predictor model or a non-linear predictor model.

20. The system of claim 16, wherein the second filter comprises a recovery filter or a smoothing filter.

21. A non-transitory computer program product comprising a computer-readable storage medium having computer-readable program instructions, which when executed result in operations comprising:
monitoring power system data comprising one or more data packets to identify data transmission reliability;
continually generating a predicted data packet characterizing predicted power system data of the power grid based on filtering of the one or more data packets using at least two filters, wherein one of the at least two filters down-sample the power system data comprising at least one of active power data, reactive power data, frequency data, voltage phasor data, or current phasor data;
determining a substitution factor of the one or more data packets; and
dynamically and selectively substituting the predicted data packet in place of the one or more data packets of the power system data in real time based on the substitution factor to facilitate a continuous, reliable power system data stream within the power grid, wherein the continuous, reliable power system data stream having the predicted data packet is provided to at least one distributed energy resource.

* * * * *